United States Patent
Somlyai

(10) Patent No.: US 9,675,903 B2
(45) Date of Patent: Jun. 13, 2017

(54) PROCESS AND APPARATUS FOR THE SEPARATION OF THE COMPONENTS OF A LIQUID MIXTURE

(75) Inventor: Gábor Somlyai, Budapest (HU)

(73) Assignee: HYD Rákkutatóés Gyógyszerfejlesztö Kft., Budapest (HU)

( * ) Notice: Subject to any disclaimer, the term of this patent is extended or adjusted under 35 U.S.C. 154(b) by 534 days.

(21) Appl. No.: 14/236,929

(22) PCT Filed: Aug. 13, 2012

(86) PCT No.: PCT/HU2012/000069
§ 371 (c)(1),
(2), (4) Date: Feb. 27, 2014

(87) PCT Pub. No.: WO2013/024310
PCT Pub. Date: Feb. 21, 2013

(65) Prior Publication Data
US 2014/0158520 A1    Jun. 12, 2014

(30) Foreign Application Priority Data

Aug. 12, 2011    (HU) .................................... 1100435

(51) Int. Cl.
| | |
|---|---|
| *B01D 1/14* | (2006.01) |
| *B01D 59/04* | (2006.01) |
| *B01D 19/00* | (2006.01) |
| *B01D 1/00* | (2006.01) |
| *B01D 5/00* | (2006.01) |
| *B01D 3/00* | (2006.01) |
| *B01D 59/22* | (2006.01) |

(52) U.S. Cl.
CPC ......... *B01D 19/0005* (2013.01); *B01D 1/007* (2013.01); *B01D 1/14* (2013.01); *B01D 3/008* (2013.01); *B01D 5/006* (2013.01); *B01D 59/04* (2013.01); *B01D 59/22* (2013.01)

(58) Field of Classification Search
CPC .......... B01D 1/007; B01D 1/14; B01D 3/008; B01D 5/006; B01D 59/04
See application file for complete search history.

(56) References Cited

U.S. PATENT DOCUMENTS

| | | | |
|---|---|---|---|
| 4,015,944 A | | 4/1977 | Pauluis et al. |
| 5,190,670 A | * | 3/1993 | Stearns ................ B01D 5/0081 |
| | | | 210/180 |
| 5,202,032 A | | 4/1993 | Shoemaker |
| | | | (Continued) |

FOREIGN PATENT DOCUMENTS

| | | | | |
|---|---|---|---|---|
| EP | 1905854 A2 | 4/2008 | | |
| HU | 227597 B | 1/2008 | | |
| WO | WO2009/000019 A1 * | 12/2008 | ............... | B01D 1/14 |

*Primary Examiner* — In Suk Bullock
*Assistant Examiner* — Jonathan Miller
(74) *Attorney, Agent, or Firm* — Jason D. Voight

(57) ABSTRACT

Process and apparatus for the separation of the components having different boiling points of a liquid mixture, characterized in that forming bubbles by a carrier gas in the liquid mixture where the one or more volatile component is getting enriched in the bubbles, then after said bubbles leave the liquid phase the released vapor content of them is collected and condensed and the obtained liquid being enriched in the more volatile component(s) is separated from the carrier gas.

13 Claims, 3 Drawing Sheets

(56) References Cited

U.S. PATENT DOCUMENTS

| | | | |
|---|---|---|---|
| 6,827,861 B2 * | 12/2004 | Kerfoot | B01F 3/04262 |
| | | | 166/250.02 |
| 7,264,747 B2 * | 9/2007 | Kerfoot | B01F 3/04262 |
| | | | 210/759 |
| 7,666,313 B2 * | 2/2010 | Kerfoot | B09C 1/002 |
| | | | 210/747.8 |
| 8,137,703 B2 * | 3/2012 | Chiba | A61L 2/183 |
| | | | 210/150 |
| 2010/0122899 A1 | 5/2010 | Hartman et al. | |
| 2010/0314239 A1 | 12/2010 | Gropp et al. | |

* cited by examiner

PROCESS AND APPARATUS FOR THE SEPARATION OF THE COMPONENTS OF A LIQUID MIXTURE

This is the national stage of International Application PCT/HU2012/000069, filed Aug. 13, 2012.

The invention relates to an apparatus and process for separation and concentration of liquids with different boiling point.

PRIOR ART

Fractional distillation has been used in the industry for decades to separate substances of different boiling point. Separation of alcohol from water, or obtaining mineral oil products of boiling points are well-known examples. In both, the difference in the boiling points of the components to be separated is large, up to several tens of degrees centigrade (° C.), so separation by fractional distillation is relatively easy and economical—what shows that alcohol, and oil derivatives, produced this way are manufactured and used in the order of million tons per year. Major challenge is separation of substances with slightly different (0.5-2° C. difference) boiling point and have, hence, low fractionation constant. Such materials can be separated only in columns of very high (theoretical or physical) plate number at considerable energy expenditure. Separation of compound containing stable isotopes is such a difficult task. The present invention is primarily an apparatus for separation and concentration of water molecules containing the stable isotopes of hydrogen ($H_2O$, HDO, $D_2O$) and a process to operate the said apparatus.

The technology of manufacturing deuterium-depleted water (DDW) exists, and is based on classical fractional distillation, making use of the boiling point difference of $H_2O$ and HDO (0.5° C.) and $H_2O$ and $D_2O$ (1.5° C.). Separation essentially means that, in equilibrium state, the product of lower boiling point (here: $H_2O$) will be minimally (at 100° C., to 1.2%) concentrated in the vapor phase. The fractional distillation columns used today are built to provide for stable water-vapor equilibrium on physical or theoretical "plates" where vapor, rising from plate to plate, gradually loses the components with higher boiling point (in this case: HDO, $D_2O$), and DDW can be obtained at the top of the column by condensing the vapor. The higher is the plate number for separating normal and heavy water, the lower will be the deuterium level in the product.

The efficiency of separation is determined by several parameters. Decisive factors are the amount of vapor flowing in the column, the area providing for water-vapor equilibrium, and the fractionation (concentration) constant (the lower separation temperature results in, higher fractional constant). Fractionation constant defines to what percent the more volatile component is more concentrated in the vapor than in the liquid phase at a given temperature For $H_2O$ and HDO, the fractionation constants are given in the table below from 0 to 100° C., in 5° C. steps.

| Temperature (° C.) | Fractionation constant (%) | Change (ppm) |
|---|---|---|
| 0 | 10.2 | 15.6 |
| 5 | 9.5 | 14.25 |
| 10 | 8.9 | 13.35 |
| 15 | 8.3 | 12.45 |
| 20 | 7.8 | 11.7 |
| 25 | 7.3 | 10.95 |
| 30 | 6.8 | 10.2 |
| 35 | 6.3 | 9.45 |
| 40 | 5.9 | 8.85 |
| 45 | 5.5 | 8.25 |
| 50 | 5.2 | 7.8 |
| 55 | 4.8 | 7.2 |
| 60 | 4.5 | 6.75 |
| 65 | 4.2 | 6.3 |
| 70 | 4.0 | 6.0 |
| 75 | 3.7 | 5.55 |
| 80 | 3.5 | 5.25 |
| 85 | 3.2 | 4.8 |
| 90 | 3.0 | 4.5 |
| 95 | 2.8 | 4.2 |
| 100 | 2.6 | 3.9 |

Generation of DDW is, of course, proportional to the amount of vapor flowing through the column (while D concentration rises in the water at the bottom). It is a case of point, that although the fractionation constant is higher at lower temperatures, the corresponding partial vapor pressures are much lower, so at low temperatures the amount of water carried in the vapor is low which will limit productivity. Furthermore, it should be noted that the minimal difference in boiling points requires that only $\frac{1}{15}$ to $\frac{1}{18}$ part of the product is led off to upkeep the equilibrium in the column. So, practically, by using one ton of vapor per hour only 55-65 liters of DDW can be manufactured.

The efficiency of separation highly depends on the size of the water-vapor contact area, to obtain the water-vapor equilibrium at the given temperature as fast as possible. Several methods have been developed in the past decades to increase the contact area. A known classical solution uses bubble caps. In this case, every plate in the column is covered by a water layer of a few centimeters, where the steam rising from the lower plate is forced to bubble through by the use of bubble cup. In this process, vapor is present in the water phase only for minimal time, and the contact area is determined largely by the column diameter and the area of the water layer on the plates. In a 1 m diameter column, this area is 0.785 $m^2$. Another way to increase the contact area is to fill the column with a porous material which gives large area in small volume. If the area is sufficiently wettable by water, there will be increased equilibration between the rising vapor and the water layer on the solid surface over a unity of length and the efficiency of separation will approximate the theoretical maximum. A generally used form of column packing is Raschig rings, the porous ceramic surface of which provides the area for separation of substances with different boiling points. Better separation per volume unit can be achieved using a so-called ordered packing, in which maximum surface per volume unit is given by a precisely bent meshwork made of fine metal wires. In case of manufacturing DDW or heavy water, an extra cost is incurred because stainless steel is not well wetted by water so the packing must have a phosphorous bronze finish.

In all these procedures, separation happens essentially at the contact surface of the liquid and vapor, and some solid "scaffold" is used to create the liquid surface. In case of bubble caps, the trays themselves give the solid part, in packed columns, it is the ceramic filling, ordered packing or some other solid substance. The existing methods of manufacturing DDW have the following disadvantages: 1. One distillation column has low capacity, even at high energy input; 2. Operating the column at 100° C., fractionation constant is low, necessitating high plate number for attaining the theoretical maximum D level decrease, resulting in elevated investment costs; 3. Higher fractionation constant can be achieved by distilling in vacuum at a lower temperature, but the control system is then more complicated, and capacity is decreased because less water is present in the vapor phase at lower temperature; 4. Distillation columns represent high investment costs, increased further by the auxiliary equipment (high-throughput boilers, tall building for the columns, large cooling capacity).

SUMMARY OF THE INVENTION

The primary object of the invention is an apparatus, able to separate components of different boiling points more efficiently than the methods available at present.

This invention is based on the recognition that by generating bubbles in the liquid to be separated to components, the liquid-vapor phase interface area can be largely increased. This area will be sufficient to allow rapid concentration of the more volatile component in the air space of the bubbles, and the liquid-vapor equilibrium at the given temperature will be reached relatively quickly. In contrast to the existing procedures (using trays, Raschig rings or an ordered packing) the invention enables to create the surface, where the components of different boiling points separate according to their fractionation constant, within the liquid phase itself. When the bubbles burst on reaching the surface of the liquid, their gas content, together with the vapor enriched in the more volatile component, goes to the space above the liquid.

Further, as smaller (micro) bubbles stay longer in the liquid phase, sufficient time is given for the liquid-vapor equilibrium to settle.

So the invention relates primarily to such a process for separation of components of a liquid with different boiling points, in which bubbles are generated in the liquid phase by a carrier gas, where the more volatile component(s) of the liquid is/are concentrated; and as the bubbles enriched in the more volatile component(s) leave the liquid phase, the vapor released is collected and condensed, and the resulting liquid—being rich in the volatile component(s)—is separated form the carrier gas.

Further, of advantage is a process according to the above, where the diameter of the bubbles is 5-5000 µm.

Further, of advantage is a process according to the above, where at least 70% of the bubbles has 5-200 µm diameter.

Further, of advantage is a process according to the above, where 70% of the bubbles is till in the liquid phase after 5 minutes.

Further, of advantage is a process according to the above, where at least 70% of the bubbles has 500-5000 µm diameter, or even more advantageously 750-3000 µm diameter.

Further, of advantage is a process according to the above, where the carrier gas used to generate bubbles is a mixture of one or more gases of low boiling point; practically air.

Further, of advantage is a process according to the above, where the liquids of different boiling points to be separated are $H_2O$, HDO and $D_2O$ (a blend of these, as it is found in natural waters) and the concentration step of the process is performed at 5-100° C., preferably at 40-70° C.

Further, of advantage is a process according to the above, where the release of gas mixture from the bubbles is promoted by spreading the liquid on a solid surface.

Another object of the invention is an apparatus set up for implementation of the process. So the invention also relates to an apparatus for separation of components of a liquid with different boiling points, said apparatus comprising:

at least one liquid tank (1) with at least one liquid inlet (2), at last one liquid outlet (3), and at least one gaseous medium outlet (4);

at least one feed line (6) connecting the liquid tank (1) via the liquid inlet (2) with a liquid source (5);

a condenser unit (9) in flow-through contact with the inner space (7) of the liquid tank (1) via the gaseous medium outlet (4) and a connecting pipe (8);

a collector tank (11) connected to the outlet (10) of the condenser unit (9) via pipe (30);

characterized in that:

in the feed line (6) between liquid source (5) and liquid inlet (2), a liquid pump (12) and a bubble generator (13) connected to the outlet of the former are included;

the gaseous medium inlet (14) of the bubble generator (13) is connected to the outlet (16) of the gaseous medium compressor (15);

the liquid outlet (3) of the liquid tank (1) is connected to the inlet of the liquid pump (12) via the return line (17) and a unifier-distributor unit (18) which is connected also to the liquid source (5);

the outlet (31) of the collector tank (11) connected to the outlet (10) of the condenser unit (9) is connected, via another unifier-distributor unit (32) to the inlet of the final product collector tank (29) but also to an additional liquid inlet (19) of liquid tank (1); and the air space (33) of the collector (11) is connected to the vacuum pump (27).

Of advantage is an apparatus according to the above, where the bubble generator (13) works with ceramic tubes penetrable for gaseous medium;

Further, of advantage is an apparatus according to the above, where (FIGS. 2 and 3) the outlet (20) of the bubble generator (13) is connected to one liquid inlet (2) in the lower part (expediently in the lower third) of the liquid tank (1) and to another liquid inlet (22) in the upper part (expediently in the upper third) of the liquid tank (1), via the distributor unit (21). Element (21) can be a directional control valve.

Further, of advantage is an apparatus according to the above, where the bubble generator (13) is one generating bubbles of 5-5000 µm. It is expedient if the bubble generator (13) is generating a total bubble volume of a few $cm^3$/min to a few $m^3$/min.

It is of advantage if the condenser (9) comprises a tubular heat exchanger (23).

It is of advantage if unifier-distributor unit (18) is a directional control valve or a manifold valve, and can be remote controlled.

It is if advantage of the liquid tank (1) is standing, cylindrical and closed.

Further, of advantage is an apparatus according to the above, where the inner space (7) of the liquid tank (1) contains a surface-enlarging element (24). It is expedient if this element has a grid structure.

Further, of advantage is an apparatus according to the above, where a heat-transfer unit (25) is attached to the tank (1). It is expedient if unit (25) is placed inside (7) of the liquid tank, near to its bottom, or, more practically, in contact with that. Heat transfer unit (25) can be a tubular heat exchanger or an electric heater.

Further, of advantage is an apparatus according to the above, where the liquid tank (1) has an overflow outlet (26).

It is expedient if at least one of the upper or lower sections of the tank (1) is jacket-walled in which a fluid of different temperatures can circulate.

Further, of advantage is an apparatus according to the above (FIG. 3) which contains several liquid tanks (1) connected in series in such a way that the gaseous medium outlet (4) of a previous tank (1) arranged in the upper part of it is connected to the inlet (28) of the compressor (15) belonging to the subsequent tank (1), and the gaseous medium outlet (4) of the last liquid tank (1) in the series is connected to the inlet (34) of the condenser unit (9), and the overflow outlet (26) of a liquid tank (1) being forward to another one in the series is connected to the additional liquid inlet (19) of the previous tank via the connecting line (35).

The apparatus containing several liquid tanks (1) can be constructed so that the liquid outlet (3) of a given liquid tank (1) is connected to the inlet of the liquid pump (12) of one of the previous tanks (1).

Carrier gas is fed in the system at the inlet (36) of the compressor.

As described above, the apparatuses can be connected in series to increase separation. In such a system, it is expedient to connect in series one after another, and the vapor from one tank air space (7), enriched in the component of lower boiling point, is used to generate bubbles in the next tank. By increasing the number of bubble generators in the system the separation of components with different volatility can be increased to any level.

DETAILED DESCRIPTION OF THE INVENTION

The liquid mixture can be any kind containing components of different boiling point. Obviously, the process is most advantageous in case of mixtures where there is little difference (e.g. 0.5-3° C.) between the boiling points of the components; but it can be also applied, of course, when the boiling point difference is higher (e.g. 3-30° C.). The invented process is highly suitable for manufacturing deuterium-depleted water, DDW (that is for separation of $H_2O$, HDO and $D_2O$ which have nearly the same boiling point). In the examples and the advantageous implementation forms, DDW production is described, but the basic idea of the invention—increasing the liquid-vapor interfacial area by generating bubbles—can clearly be adapted by a skilled person for other mixes (e.g. water-alcohol mixtures, mixed organic solvents).

According to the invented technical solution, the diameter of the bubbles can vary widely (is practically between 5 and 5000 μm). Decreasing the size of the bubbles will increase the time to stay in the liquid. Microbubbles (of 5-200 μm diameter) can be also used. Of these, 70% remains in the liquid even after 5 minutes. Although with microbubbles the equilibrium to be reached is more close to the theoretical liquid-vapor equilibrium at the given temperature, an additional task is to make microbubbles leave the liquid phase and discharge their contents in the space above the liquid. This can be promoted by spreading the liquid partially or fully saturated with microbubbles, that is, by letting it flow over a large surface to promote make the bubbles merge and/or burst.

Microbubbles are produced in a so-called microbubble generator. Several companies manufacture and sell such devices, so the most appropriate device can be picked from a broad choice. Depending on type, bubbles of ca. 5-200 μm diameter can be produced by microbubble generators.

In another advantageous embodiment, bigger bubbles are generated. In this case the content of the bubbles are transferred easier in the air space, e.g. by letting the liquid flow along a surface. In case of such bigger bubbles (ca. 500-5000 μm, or even more preferably 750-3000 μm diameter) it is advantageous to recirculate the bubble-containing liquid into the tank several times, to ensure sufficiently long contact time of liquid and vapour (preferably 70% of the bubbles falls into this range). The advantageous constructions shown in the figures are of this kind.

Hereafter, "bubbles" mean both microbubbles and bigger bubbles, and any mixture of these (unless the sizes are specified).

To generate bubbles, a so-called carrier gas is required. The boiling point of the carrier gas should be much lower than that of the components to be separated, it is advantageous if the gas at the temperature of use is above its critical temperature. This way the gas will not liquefy in the condenser which can be advantageously a heat exchange or it can work on the basis of condensation achieved by pressure increase.

At separating substances of different boiling point, one of the decisive factors is the sufficiently large area where the components can separate according to their boiling point. The invention also relates to an apparatus which provides the sufficient separation area by means of bubbles.

In an advantageous embodiment, temperature gradient is created in the liquid tank (practically a cylindric tank) so that the top of the water column is warmer than the bottom. This way, the rising bubbles will expand reaching layers of ever higher temperatures, increasing the lifting force acting on the bubble and driving these to the water surface where their contents are discharged in the space being over the water.

In actual implementation of the invention, it has to be determined experimentally for a given material to be separated, bubbles of what size will—depending on the density, viscosity, boiling point etc. of the liquid and other physicochemical parameters (such as external pressure)—remain stably in the liquid, and at which size and temperature will change the floating behaviour of the bubbles and they rise to the surface on the effect of lifting force. In operating the apparatus, the size of bubbles and the temperature gradient of the column have to be set accordingly.

An another advantageous implementation, surfacing of the bubbles can be promoted also by creating conditions, at a given distance from the top in the water column, which accelerate the coalescence of bubbles and microbubbles, and the size increase will force the resulted big bubbles to the surface.

Further, the annihilation of the bubbles at the surface and the transfer of their content to the air space being over the water can be promoted if a porous material or some other material, the collision with which induces bubble annihilation, touches the water surface.

Further, surfacing the bubbles can also be promoted by leading the liquid leaving the bubble generator, or a fraction of it, to the top of the tank and letting it flow down the tank wall or an extra large-surface element, e.g. a sieve-like matter. Flowing down, the bubbles reach the surface with high probability, burst, and the components carried in them are emptied in the air space. Surface-enlarging elements other than sieves (porous ceramics, wire mesh packing, etc.) can be also applied; and these elements can be used in several layers or stepwise, with the liquid flowing from one to another.

To increase enrichment of the more volatile component, implementation is possible also in such a way in which the gaseous medium above the liquid (practically steam-containing air, hereafter: steam) and within it the components in the gas phase (present in steam form at the applied temperature and pressure) is pumped in the bubble generator of a subsequent tank unit (e.g. is led through the bubble-generating ceramic or other elements). This will achieve further concentration of the component with lower boiling point. It is expedient to connect so many apparatuses according to the invention in series with which the required enrichment can be reached.

In a further advantageous implementation of the invention, the continuous separation and the continuous operation of the plant are assured by moving the liquid and the steam used in the bubble generators in countercurrent. Steam taken from one unit is led to the next unit via the bubble generator, and the liquid condensed at the end of the system is returned to the last unit. This will raise the liquid level there and will flow back to the previous unit, practically in a gravitational overflow. Final product is taken away from the condensate at the end of the system, where the proportion of takeoff is related to the extent of separation and productivity. In case of water, $1/12$ to $1/15$ of the condensate can be taken off as final product.

By the forward flow of steam and backward flow of liquid, the ratio of components with different boiling points slowly changes in the whole system, the mount of the more volatile component increases from unit to unit. So that the less volatile component is not enriched, fresh liquid has to be fed into the first column.

As described here above, the large water-steam interface area (or any liquid-steam interface area) for separation of the components having different boiling points is achieved not by means of a solid structure (as in the decades-old process used by now) but by bubbles present within the liquid. This idea may enable the production of any amount of DDW required by the pharmaceutical industry (possibly several million liters a day) by relatively cheap equipment and without high energy consumption. Separation of any other liquid material my also be done more economically. Another major advantage of the apparatus and process is that it can be deployed anywhere with little preparatory work and additional investment.

The surface-related parameters of the apparatus according to the invention are exemplified with the calculations below:

A bubble-cap column for fractional distillation, as used today, provides the following area per plate for equilibration of water and steam, depending on column diameter:

| Column diameter | 0.6 m | 1.0 m | 1.5 m |
|---|---|---|---|
| Plate area | 0.27 m$^2$ | 0.78 m$^2$ | 1.76 m$^2$ |

In contrast, by introducing merely 10 cm$^3$ of air per minute in the system, e.g. through the bubble-generating ceramic elements, the water-steam phase interface area is, depending on bubble size:

| Bubble diameter | 5 μm | 10 μm | 50 μm | 100 μm |
|---|---|---|---|---|
| Water-steam contact area | 1.17 m$^2$ | 0.58 m$^2$ | 0.11 m$^2$ | 0.04 m$^2$ |

During operation, the amount of air introduced in the liquid phase and that of the bubbles leaving the water should be in equilibrium. If the flow of 10 cm$^3$ per minute can be maintained, the bubble area generated in the water per hour is, depending on bubble diameter, as follows:

| Bubble diameter | 5 μm | 10 μm | 50 μm | 100 μm |
|---|---|---|---|---|
| Area generated per work hour | 70.2 m$^2$ | 34.8 m$^2$ | 6.6 m$^2$ | 2.4 m$^2$ |

The advantageous properties of the apparatus created according to the invention, and the process, are as follows:
- Separation is done at a lower temperature, saving considerable energy;
- At lower temperature, fractionation constant is higher than with boiling at 100° C., so the required enrichment is reached in fewer steps;
- The apparatus can built more simply and cheaply than the traditional distillation towers of 10-30 m height;
- The supplementary equipment (gas-fired boiler, cooling capacity, structural elements of a distillation tower, etc.) are not needed, or their size and costs are much smaller than for the distillation equipment known today;
- No several stories high structure is needed, the units of the apparatus can be placed next to each other in one hall;
- The number of units, and so the grade of enrichment, can be varied any time as required by the production process.

Figure 1:
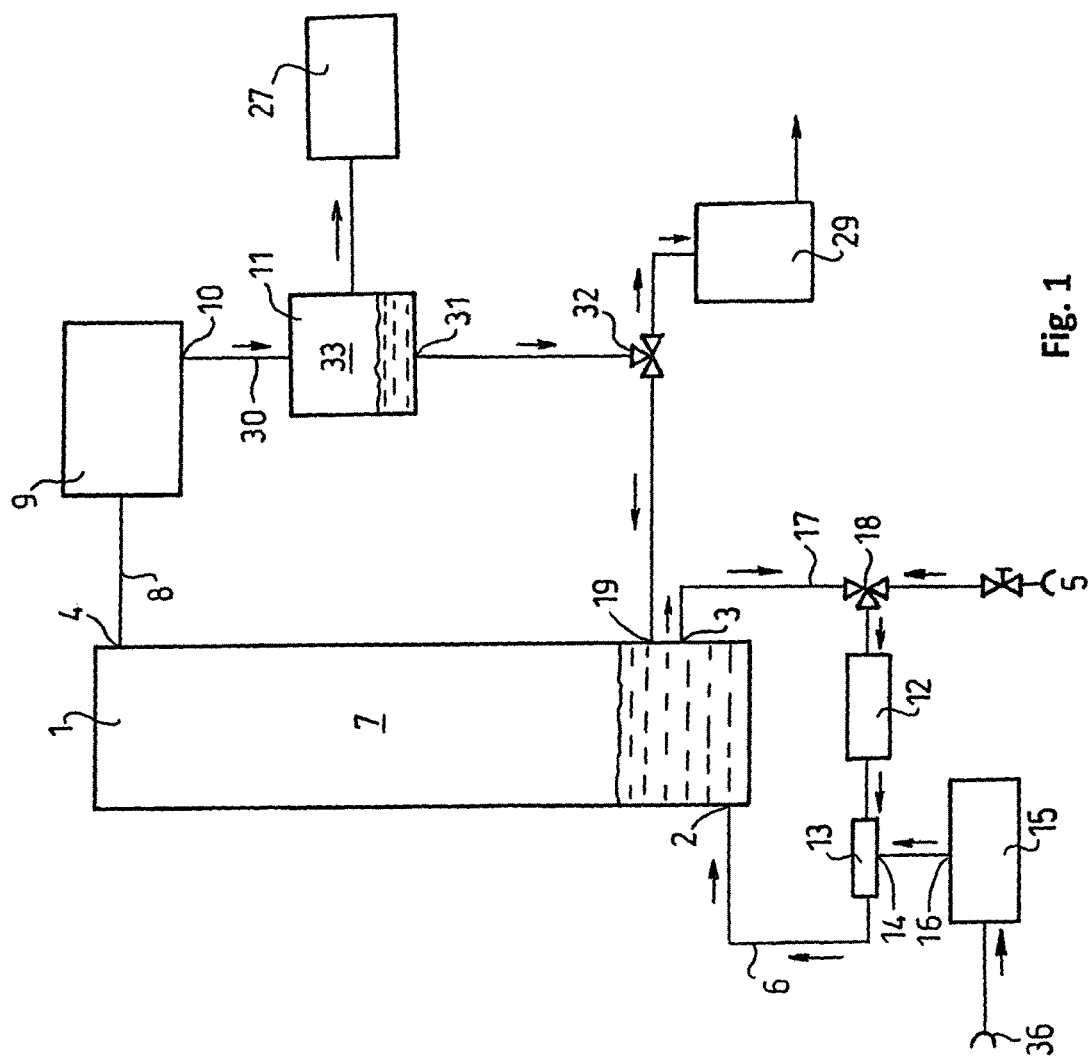
FIG. 1 shows a stand-alone (one unit) apparatus.
Figure 2:
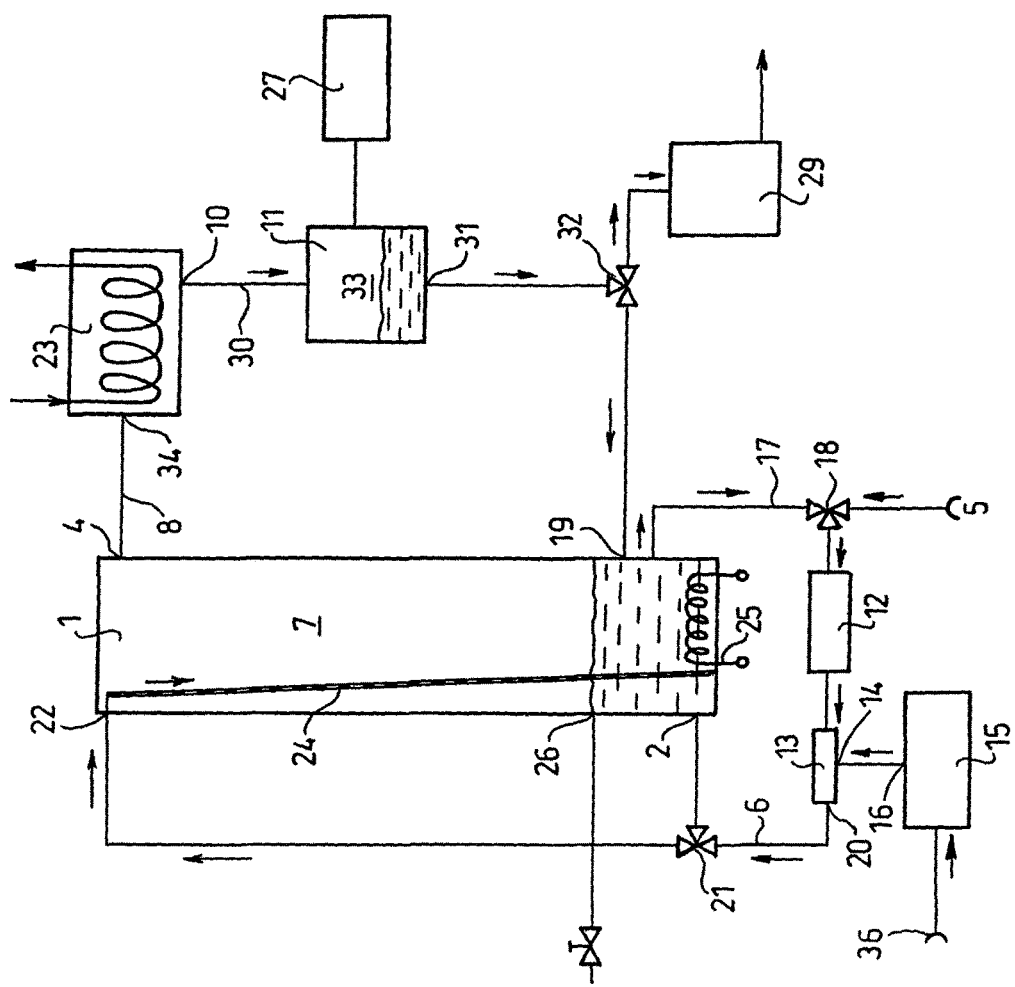
In FIG. 2, the system already includes an area-enlarging element, to which a fraction of water leaving the bubble generator is directly led. In the variation shown, a part of the bubble-enriched liquid flows to the top of the tank, and there, to the area-enlarging element.
Figure 3:
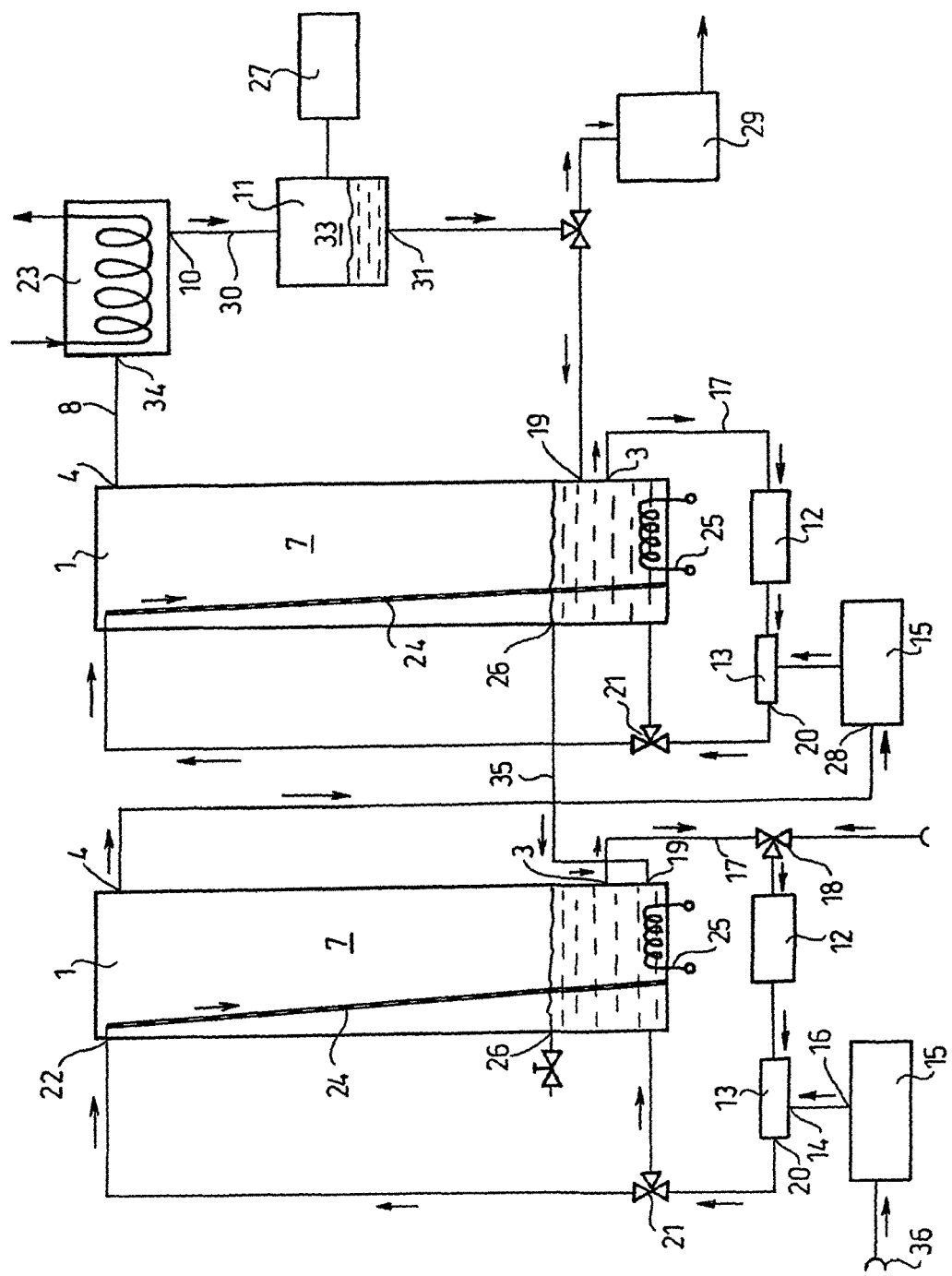
FIG. 3 shows a system formed by connecting two of the units shown in FIG. 2. It should be noted also here that, in theory, any number of the base units (one liquid tank 1 with its fixtures) can be connected in the above way.

LEGEND TO THE FIGURES 1 liquid tank
2 liquid inlet
3 liquid outlet
4 gaseous medium outlet
5 liquid source
6 feed line
7 inner space of the liquid tank
8 connecting pipe
9 condenser unit
10 outlet of condenser unit
11 collector tank
12 liquid pump
13 bubble generator
14 gaseous medium inlet
15 compressor
16 compressor outlet
17 return line
18 unifier-distributor unit
19 additional liquid inlet
20 bubble generator outlet
21 distributor unit
22 liquid inlet arranged in the upper part of the tank
23 tubular heat exchanger
24 surface-enlarging unit 25 heat transfer unit
26 overflow outlet
27 vacuum pump
28 compressor inlet
29 final product collector tank
30 pipe
31 collector tank outlet
32 unifier-distributor unit
33 collector tank air space
34 condenser inlet
35 connecting line
36 compressor inlet The invention is interpreted, without limiting the scope of patent protection, by the following examples:

Example 1

A tank of 15 L volume and 25 cm diameter is filled with 10 L water. The liquid tank (1) can be heated from below by the heat transfer unit (25) so water temperature can be set to any value. At the top of the tank (1) are connected the thermometer (but is not shown on the Figure because it is obvious) and the condenser unit (9) (a tubular heat exchanger). Liquid inlet (2) and outlet (3) are built in the side of the tank (1).

The liquid inlet (2) connects the liquid tank (1) to the liquid pump (12) which delivers water, drawn from the liquid tank (1) via the liquid outlet (3), through the bubble generator (13) and the liquid inlet (2) back to the liquid tank. A compressor (15) is connected to the bubble generator (13) and feeds it continuously with air. The required water amount is fed into the system from the liquid source (5) by the unifier-distributor unit (18). The liquid condensing at the bottom of the water-cooled condenser unit (9) goes to the collector tank (11) which is connected to a vacuum pump (27) providing for under pressure in the system and so for sufficient steam flow. A fraction of the water from the collector tank (11) is divided by the unifier-distributor unit (32), one line delivering the final product to the final product collector tank (29), and the other leading the remaining liquid back to the system via the additional liquid inlet (19).

This setup is shown in FIG. 1.

In the first production test, water temperature was kept at 60° C. and the microbubble generator was fed with 20 cm³/min air. The generator produced bubbles of 50-100 μm diameter and the pump moved 5-8 L/min water through the generator. The D content of the condensate was 6.7 ppm lower than that of the feed water, in good agreement with the calculated theoretical value.

Example 2

Using the above prototype but running it at 80° C., the decrease of D content in the produced water was only 4.6 ppm. This showed that separation worsens with increasing temperature, proving the correctness of the theoretical background of the invention.

Example 3

An apparatus set up from the elements in example 1, but modified as follows:

The liquid tank is 1 m high, 25 cm in diameter and contains 15 L water. The pipe leaving the bubble generator (13) is bifurcated in the distributor unit (21). One line delivers (as in example (1) bubble-saturated water to the bottom of the liquid tank (1) through liquid pump (12) and liquid inlet (2). The other line goes to the liquid inlet (22) arranged in the upper part of the liquid tank (1), and the bubble-saturated water flows down spreading on the wall of the tank, or down an extra surface-enlarging unit (24), expediently a sieve-like surface, to the bottom of the tank. The distributor unit (21) before the bifurcation regulates in what proportion the bubble-saturated water delivered by the liquid pump (12) goes to the two branches. This construction ensures that the bubbles leave the water flowing on the wall of the liquid tank (1) and so the amount of evaporated water is greatly increased.

Example 4

The same setup as in example 3 but with 100-200 μm diameter bubbles.

Example 5

The same apparatus as in example 3, but the bubble size varies between 500 and 5000 μm (mean: 500-800 μm). During operation, the distributor unit (21) after the bubble generator (13) directs 20% of the liquid flow in the bottom of the tank and 80% to its top. At larger bubble size (750-3000 μm) more water (40-75%) is led to the tank bottom; while at 5000 μm bubble diameter 80% goes to the bottom and 20% to the top of the tank.

Example 6

Five liquid tanks (1) of 20 cm diameter and 50 cm height, containing water 40 cm high. A ceramic bubble generator (13) connects to the bottom of the first cylinder through the liquid inlet (2) and brings 10 cm³/min air in the water fed in by the liquid pump (12) in form of 10 μm bubbles. The cylindric liquid tank (1) has a 10 cm wide jacket between 30 and 40 cm height in which water of 60° C. temperature is flowing. The lowest 10 cm section of the tank has an identical jacket with 20° C. water. Air and evaporated water from the inner space (7) of the first liquid tank is fed via a second ceramic bubble generator (13) in the next liquid tank (1) which is identical to the first one; and this sequence is repeated for three more times. Steam from the r inner space (7) of the last liquid tank (1) is condensed in a condenser unit (9) and led to the collector tank (11). A part of the water taken from the collector tank is bifurcated [by the unifier-distributor unit (32)]. The final product going to the final product collector tank (29), and the remaining water being returned to the system via the additional liquid inlet (19).

In the described process, the material moves from the first liquid tank (1) to the last one through the bubble generator (13). Constant water level in the liquid tanks (1) is secured by placing every tank 0.5-1 cm higher than the previous one, and connecting it via the overflow outlet (26), placed at 40 cm height, and a pipe to the bottom of the previous liquid tank (1). This way, the liquid returning to the last liquid tank (1) after condensation flows via the overflow outlet (26) to the previous tank (1) where the liquid will also surpass 40 cm height level and will flow on to the preceding tank.

Example 7

Five units described in example 3 are connected so that the air is taken from the inner space (7) of one tank (1) and is fed to the microbubble generator (13) of the next tank.

Example 8

An apparatus with identical structure to that in example 1, but with a cylindrical liquid tank (1) is of 1 m height and 50 cm diameter. Air input is 100 cm³ per minute.

The above examples demonstrate that application of bubbles in separation technology—more exactly the idea that separation of components with different boiling points is possible in the bubbles, without the need of any solid surface—opens up unlimited possibilities in the area. The size of the apparatus and the bubbles, the amount of air or other gas fed in, the number of cylinders in series, the temperature distribution, etc. can be varied at will or be optimized to the actual separation task.

The invention claimed is:

1. A process for separation of components of a liquid mixture with different boiling points, wherein bubbles are generated in the liquid mixture by a carrier gas, the bubbles become enriched in one or more volatile components, and when the bubbles leave the liquid phase the vapor released from the bubbles is collected and condensed to separate the volatile component(s) obtained from the applied carrier gas, characterized in that at least 70% of the bubbles have a diameter of 5-200 μm, and the components of different boiling points to be separated are $H_2O$, HDO and $D_2O$.

2. The process according to any of claim 1, where 70% of the bubbles are still present in the liquid phase after 5 minutes.

3. The process according to claim 1, where the carrier gas is air.

4. The process according to claim 1, in which the mixture is at 5 to 100° C.

5. The process according to claim 1, where the release of vapor from the bubbles is promoted by spreading the liquid on a solid surface.

6. The process according to claim 1, where the carrier gas is above its critical temperature.

7. The process according to claim 1, in which the mixture is at 40 to 70° C.

8. An apparatus for separating components with different boiling points of a liquid mixture, comprising:
   at least one liquid tank (1) with at least one liquid inlet (2), at last one liquid outlet (3), and at least one gaseous medium outlet (4);
   at least one feed line (6) connecting the liquid tank (1) via the liquid inlet (2) with a liquid source (5);
   a condenser unit (9) in flow-through contact with the inner space (7) of the liquid tank (1) via the gaseous medium outlet (4) and a connecting pipe (8);
   a collector tank (11) connected to the outlet (10) of the condenser unit (9) via pipe (30);
   characterized in that:
   in the feed line (6) between liquid source (5) and liquid inlet (2), a liquid pump (12) and a bubble generator (13) connected to the outlet of the former are included;
   the gaseous medium inlet (14) of the bubble generator (13) is connected to an outlet (16) of a gaseous medium compressor (15);
   the liquid outlet (3) of the liquid tank (1) is connected to the inlet of the liquid pump (12) via the return line (17) and a unifier-distributor unit (18) which is connected also to the liquid source (5);
   the outlet (31) of the collector tank (11) connected to the outlet (10) of the condenser unit (9) is connected, via another unifier-distributor unit (32) to the inlet of a final product collector tank (29) but also to an additional liquid inlet (19) of liquid tank (1);
   the air space (33) of the collector (11) is connected to a vacuum pump (27) and
   an outlet (20) of the bubble generator (13) is connected, via a distributor unit (21) to said liquid inlet (2) in the lower part of the tank (1) and another liquid inlet (22) arranged in the upper part of the tank.

9. The apparatus according to claim 8, characterized in that the bubble generator (13) producing bubbles of 5-200 μm.

10. The apparatus according to claim 8, characterized in that a surface-enlarging element (24) is placed in the inner space (7) of the liquid tank (1).

11. The apparatus according to claim 8, characterized in that a heat transfer unit (25) is joined to the liquid tank (1).

12. The apparatus according to claim 8, characterized in that an overflow outlet (26) is built on the liquid tank (1).

13. An apparatus for separating components with different boiling points of a liquid mixture, comprising:
   at least one liquid tank (1) with at least one liquid inlet (2), at last one liquid outlet (3), and at least one gaseous medium outlet (4);
   at least one feed line (6) connecting the liquid tank (1) via the liquid inlet (2) with a liquid source (5);
   a condenser unit (9) in flow-through contact with the inner space (7) of the liquid tank (1) via the gaseous medium outlet (4) and a connecting pipe (8);
   a collector tank (11) connected to the outlet (10) of the condenser unit (9) via pipe (30);
   characterized in that:
   in the feed line (6) between liquid source (5) and liquid inlet (2), a liquid pump (12) and a bubble generator (13) connected to the outlet of the former are included;
   the gaseous medium inlet (14) of the bubble generator (13) is connected to an outlet (16) of a gaseous medium compressor (15);
   the liquid outlet (3) of the liquid tank (1) is connected to the inlet of the liquid pump (12) via the return line (17) and a unifier-distributor unit (18) which is connected also to the liquid source (5);
   the outlet (31) of the collector tank (11) connected to the outlet (10) of the condenser unit (9) is connected, via another unifier-distributor unit (32) to the inlet of a final product collector tank (29) but also to an additional liquid inlet (19) of liquid tank (1);
   the air space (33) of the collector (11) is connected to a vacuum pump (27), and
   the apparatus contains several liquid tanks (1) connected in series in such a way that the gaseous medium outlet (4) of a previous tank (1) arranged in the upper part of it is connected to an inlet (28) of the compressor (15) belonging to the subsequent tank (1), and the gaseous medium outlet (4) of the last liquid tank (1) in the series is connected to an inlet (34) of the condenser unit (9), and an overflow outlet (26) of the subsequent tank (1) is connected to the additional liquid inlet (19) of the previous tank via a connecting line (35).

* * * * *